(12) United States Patent
Tokushima et al.

(10) Patent No.: US 10,025,031 B2
(45) Date of Patent: Jul. 17, 2018

(54) GRATING STRUCTURE, AND MANUFACTURING METHOD OF GRATING COUPLER PROVIDED THEREWITH

(71) Applicant: PHOTONICS ELECTRONICS TECHNOLOGY RESEARCH ASSOCIATION, Tokyo (JP)

(72) Inventors: Masatoshi Tokushima, Tokyo (JP); Jun Ushida, Tokyo (JP)

(73) Assignee: PHOTONICS ELECTRONICS TECHNOLOGY RESEARCH ASSOCIATION, Tokyo (JP)

( * ) Notice: Subject to any disclaimer, the term of this patent is extended or adjusted under 35 U.S.C. 154(b) by 0 days.

(21) Appl. No.: 15/569,020

(22) PCT Filed: Mar. 7, 2016

(86) PCT No.: PCT/JP2016/056916
§ 371 (c)(1),
(2) Date: Oct. 24, 2017

(87) PCT Pub. No.: WO2016/170859
PCT Pub. Date: Oct. 27, 2016

(65) Prior Publication Data
US 2018/0128975 A1    May 10, 2018

(30) Foreign Application Priority Data

Apr. 24, 2015    (JP) .................. 2015-088950

(51) Int. Cl.
| G02B 6/34 | (2006.01) |
| G02B 6/124 | (2006.01) |
| G02B 6/13 | (2006.01) |

(52) U.S. Cl.
CPC .............. *G02B 6/124* (2013.01); *G02B 6/13* (2013.01); *G02B 6/34* (2013.01)

(58) Field of Classification Search
CPC .............. G02B 6/124; G02B 6/13; G02B 6/34
See application file for complete search history.

(56) References Cited

U.S. PATENT DOCUMENTS

| 8,270,791 B2 * | 9/2012 | Komura ................ B82Y 20/00 369/44.12 |
| 9,103,974 B2 * | 8/2015 | Kang .................... G02B 6/124 |

(Continued)

FOREIGN PATENT DOCUMENTS

| JP | S60-188911 A | 9/1985 |
| JP | S63-298307 A | 12/1988 |

(Continued)

OTHER PUBLICATIONS

R.M. Emmons and D.G. Hall, "Buried Oxide Silicon-on-Insulator Structures II: Waveguide Grating Couplers," Journal of Quantum Electronics, vol. 28, No. 1, Jan. 1992, pp. 164-175 (12 pages), IEEE.

(Continued)

*Primary Examiner* — Sung Pak
(74) *Attorney, Agent, or Firm* — Michael Best & Friedrich LLP

(57) ABSTRACT

A grating structure for a grating coupler is provided which has a high efficiency resulting from the operating principle, is easily manufactured, and simultaneously has little reflection loss. This grating structure is provided with a core layer having periodic recesses and protrusions formed on the upper surface, a first upper cladding layer in contact with the upper surface of the core layer, a second upper cladding layer in contact with the upper surface of the first upper cladding layer, and a first lower cladding layer in contact with the lower surface of the core layer. The recessed portions of said recesses and protrusions are filled with the same material as the first upper cladding layer. The refractive index of the material forming the core layer is greater than the refractive index of the materials forming the first (Continued)

upper cladding layer, the second upper cladding layer and the first lower cladding layer. The refractive index of the material of the first upper cladding layer is greater than the refractive index of the material of the second upper cladding layer. The thickness from the upper surface of the protruding portions of the recesses and protrusions to the upper surface of the first upper cladding layer is within the range obtained by subtracting ½ of the depth of the recesses and protrusions from $((2m_1-1)/4 \pm \frac{1}{8})$ times ($m_1$ being a positive integer) the wavelength, in the material forming the first upper cladding layer, of light inputted and outputted by the grating coupler.

12 Claims, 10 Drawing Sheets

(56) References Cited

U.S. PATENT DOCUMENTS

| 2011/0133063 A1 | 6/2011 | Ji et al. |
| 2011/0249938 A1 | 10/2011 | Chen et al. |
| 2017/0363785 A1* | 12/2017 | Niwa .................... G02B 5/1809 |
| 2018/0024001 A1* | 1/2018 | Brueck ................. G01J 3/2803 |
| 2018/0074264 A1* | 3/2018 | Tokushima .............. G02B 6/34 |

FOREIGN PATENT DOCUMENTS

| JP | 2011-118399 A | 6/2011 |
| JP | 2013-524286 A | 6/2013 |

OTHER PUBLICATIONS

K. C. Chang and T. Tamir, "Simplified approach to surface-wave scattering by blazed dielectric gratings," Applied Optics, vol. 19, No. 2, Jan. 15, 1980, pp. 282-288 (7 pages), The Optical Society, USA.

D. Vermeulen et al., "High-efficiency Silicon-On-Insulator Fiber-to-Chip Grating Couplers Using a Silicon Overlay" in Group IV Photonics, 2009, (3 pages).

International Search Report issued in Application No. PCT/JP2016/056916, dated May 31, 2016.

* cited by examiner

GRATING STRUCTURE, AND MANUFACTURING METHOD OF GRATING COUPLER PROVIDED THEREWITH

TECHNICAL FIELD

The present invention relates to a structure of a grating and a method for manufacturing a grating coupler comprising the grating having the structure.

BACKGROUND ART

For inputting/outputting optical signals to/from an optical circuit comprising optical waveguides on a substrate, it may be desired to provide the optical circuit with a function for outputting light propagated through an optical waveguide to the outside of the optical waveguide, and/or a function for inputting external light into an optical waveguide. A grating coupler is an optical input/output component that can be used for the above purposes; and it can input light propagated through an optical waveguide on a substrate to an end surface of an optical fiber positioned adjacent to a surface of the substrate, or it can input, in a reverse manner, light from an optical fiber to an optical waveguide.

FIG. 1 is a schematic cross-section view of a grating part in an example of a grating coupler having a construction for outputting guided light to the outside of an optical waveguide. In the following description, the construction, functions, and so on of the grating coupler will be briefly explained with reference to FIG. 1.

FIG. 1 is a schematic view of an example of a grating coupler that can be manufactured by use of a silicon-on-insulator (SOI) wafer; and the grating coupler operates to receive an optical signal via an optical waveguide, and convert an optical axis as a result of diffraction. The cross-section structure shown as an example in FIG. 1 comprises a BOX (Buried Oxide; buried oxide film) layer 102 comprising silicon dioxide ($SiO_2$), a core layer 114 comprising silicon (Si) which has a refractive index higher than that of the BOX layer 102, and an upper cladding (overclad) layer 116 comprising silicon dioxide which is the same as that in the BOX layer 102 or a material having a refractive index similar to that of the silicon dioxide in the BOX layer 102, wherein these layers are stacked in this order on a substrate 101; and a diffraction grating is formed on the core layer 114. In this manner, i.e., by simply processing the core 114 to form a diffraction grating thereon for example, the grating coupler is made to be able to perform optical-path conversion.

In the following description, an outline of a principle of operation and so on of a grating coupler for outputting guided light to the outside of an optical waveguide will be explained. Note that, although the case wherein guided light is outputted to the outside of an optical waveguide by a grating coupler will be explained in the following description, it is also possible to input external light into an optical waveguide by performing the operation in a reverse manner.

On the core layer 114 of the grating coupler 100 shown in FIG. 1, a diffraction grating is formed, wherein the diffraction grating has concavities and convexities in the direction of thickness of the waveguide (x direction) and the concavities and convexities are arranged periodically in the direction of propagation of guided light (z direction). In the case that a diffraction grating such as that described above is formed, a part of guided light is diffracted and emitted; wherein the guided light and the emitted light satisfy a requirement for phase matching in the propagation direction (z direction). Specifically, in the case that the propagation constant of the guided light is $\beta_o$, and the propagation constant of the emitted light in the z direction is $\beta_q$, the requirement for phase matching is as follows:

$$\beta_q = \beta_o + qK \qquad \text{(Formula 1)}$$

In this regard, note that q is a value corresponding to an order number (0, ±1, ±2, ...) of the emitted light, when it is defined that $K = 2\pi/\Lambda$, wherein $\Lambda$ is the period of the diffraction grating.

In this case, an emission angle θ of the emitted light with respect to a normal line of the diffraction grating can be obtained by use of the formula $$n_c \sin\theta = N + q\lambda/\Lambda \qquad \text{(Formula 2)}$$

wherein λ denotes a wavelength of light in a vacuum, N denotes an effective refractive index of the waveguide, $n_c$ denotes a refractive index of the upper cladding layer, and $\Lambda$ denotes a period of the diffraction grating.

In general, since the effective refractive index N of the waveguide takes a value between a value of a refractive index of a core and a value of a refractive index of a cladding, their relationship is represented as $N > n_c$; and the light is emitted only when the order number q satisfies $q \leq -1$. Further, since efficiency of diffraction becomes higher when the order of diffraction of diffracted light is smaller, the ratio of power distribution to the emitted light is maximized when emitted light satisfying $q = -1$ is used. Note that the above −1st order emitted light includes two types of emitted light, i.e., upwardly emitted light $P_{up}$ and downwardly emitted light $P_{down}$ that travels toward the substrate 101 side via the BOX layer 102. Also, at the same time, light $P_{ref}$ returning in the direction toward the waveguide and light $P_{trans}$ transmitting through the core layer exist. There is the following relationship, in the case that light inputted to the grating coupler is denoted by $P_{in}$:

$$P_{in} = P_{up} + P_{down} + P_{trans} + P_{ref} \qquad \text{(Formula 3)}$$

The emission angle θ of the upwardly emitted light $P_{up}$ can be freely designed by determining the period $\Lambda$, the width w, and the depth d of the grating and the thickness D of the optical waveguide. For example, in the case that the material of the core layer 114 is silicon and the material of the BOX layer 102 is silicon dioxide ($SiO_2$), ranges of values of the period $\Lambda$, the width w, the depth d, and the optical waveguide thickness D, for light having a wavelength in a range between 1.3 μm to 1.6 μm, are as follows:

$\Lambda$: 530-550 nm
FF (=1−w/$\Lambda$): 0.3-0.6
d: 60-80 nm
D: 180-220 nm

In the case that the grating coupler is used as an optical coupler for outputting light, one of performance indexes is a ratio of the upwardly emitted light $P_{up}$ to the input light $P_{in}$ inputted to the grating coupler. The above index is named upward emission efficiency $\eta_{up}$, and the upward emission efficiency $\eta_{up}$ is given as follows:

$$\eta_{up} = P_{up}/P_{in} \qquad \text{(Formula 4)}$$

It is natural in an optical coupler that it is preferable to make the upward emission efficiency $\eta_{up}$ to have a value close to 1; so that, as would be understandable from Formula 3, it is preferable to set $P_{up}$ to be large, and set $P_{down}$, $P_{trans}$, and $P_{ref}$ as small as possible.

Non-Patent Literature 1 discloses, with respect to a grating coupler formed on a SOI wafer such as that shown in FIG. 1, a basic policy of designing for increasing $P_{up}$ and reducing $P_{down}$. One designing policy thereof is to set the thickness of the core layer 114 to have a value that is an integer multiple of ½ of a wavelength of light in a material forming the core layer 114, and another designing policy thereof is to set the thickness of the BOX layer 102 to have a value that is an odd-number multiple of ¼ of a wavelength of light in a material forming the BOX layer. By setting the thickness of the core layer 114 to have a value that is ½ of a wavelength of light, the phase of light that is directly and upwardly scattered by the concavities and convexities in the grating on the surface of the core layer and the phase of the light that is downwardly scattered and then returned after reflected at the back surface of the core layer 114 are aligned with each other (in-phase). As a result, the upwardly scattered light and the returned light constructively interfere with each other without cancelling one another, and the constructively interfered light is emitted upwardly; thus, $P_{up}$ increases. On the other hand, by setting the thickness of the BOX layer 102 to have a value that is an odd-number multiple of ¼ of a wavelength of light, the light that passes through the back surface of the core layer 114 and enters the BOX layer and, thereafter, is reflected by the back surface of the BOX layer 102 and returned and the light that is reflected by the back surface of the core layer 114 and directly oriented upward constructively interfere with each other without cancelling one another. As a result, many pieces of light in the downwardly scattered light, that was once scattered downwardly form the surface of the core layer 114, return upwardly, so that the ratio of $P_{down}$ relatively decreases. As explained above, $P_{up}$ increases and $P_{down}$ decreases by appropriately designing the thickness of a SOI layer and the thickness of a BOX layer, so that the upward emission efficiency $\eta_{up}$ can be made to be large up to a certain magnitude.

However, in the case that reflection of the back surface of the SOI layer and/or the back surface of the BOX layer is simply maximized, it is not possible to sufficiently reduce the amount of the downwardly emitted light, so that the degree of increasing of the upward emission efficiency $\eta_{up}$ is limited. It is possible to reduce the amount of the downwardly emitted light by providing the back surface of the grating with a metal reflection film or a reflection film comprising a multilayer film; however, since the manufacturing process for such a construction will be complex, this idea is impractical. Thus, a grating structure, which is based on a different principle of operation, for further increasing the upward emission efficiency $\eta_{up}$ was created.

In the construction of the grating, it is attempted to increase the upward emission efficiency $\eta_{up}$ by making scattered light, that is scattered by concavities and convexities on a grating, to be efficiently scattered only in the upward direction, originally. For example, a structure of a grating by which light is efficiently scattered in an upward direction is disclosed in Non-Patent Literature 2, wherein a concavity and convexity part of the grating is formed to have an asymmetrical saw blade shape, for making successful interference of scattered light to be occurred within an SOI layer so as to make phases of pieces of upwardly scattered light only are to be aligned to each other.

Further, Non-Patent Literature 3 discloses a structure, wherein a grating part is made to be thick by stacking polysilicon, amorphous silicon, or the like, and, thereafter, deep grooves of a grating are made thereon. FIG. 2 is a schematic figure of a cross section of a grating disclosed in Non-Patent Literature 3, for explaining an operation of the grating. As shown in FIG. 2, in the grating structure, scattered light is mainly generated at corners on the bottoms of the grooves in the grating. That is, inputted light is scattered at the corners on the bottoms of the concavity and convexity part of the grating; and pieces of downwardly scattered light 230 and 231 are generated, wherein one of the pieces of the downwardly scattered light travels through silicon in the SOI layer in a manner similar to that of another of the pieces of the downwardly scattered light. The period of the grating is selected in such a manner that the phases of the pieces of light are different by an odd-number multiple of n from each other, i.e., have phases opposite to each other, at the time that the pieces of light are generated. Thus, the pieces of downwardly scattered light destructively interfere with each other, and cancel out with each other. On the other hand, among pieces of the upwardly scattered light, even if the phase of light 232, that is scattered upwardly through a concavity, in the scattered light is shifted by $\pi$ from the phase of light 233, that is scattered upwardly through a convexity, in the scattered light when they are generated, the phase shift disappears while the pieces of light propagate through a path having a different refractive index; and the phases of the pieces of light become the same when they arrive at the top part of the grating. Therefore, the light 232 and the light 233 constructively interfere with each other, and are efficiently emitted in the upward direction. For making reversed-phase and/or in-phase interference to be occurred, the thickness of the SOI layer and/or the depth of the groove are/is adjusted. Silicon layer 242 stacked on the grating part is referred to as an "overlay" to the SOI layer. In addition to silicon, a dielectric material having a high refractive index, such as a silicon nitride film ($Si_3N_4$ film), may be used as a material of the overlay, according to an available processing technique.

As explained above, the prior-art structures of the gratings disclosed in Non-Patent Literature 2 and Non-Patent Literature 3 are superior in the effect for increasing upwardly emitted light $P_{up}$ and reducing downwardly emitted light $P_{down}$, when the grating structures only are viewed. However, in actuality, an expected degree of upward emission efficiency $\eta_{up}$ may not be obtained, due to a variety of restrictions. For example, regarding the structure of the grating disclosed in Non-Patent Literature 2, it is difficult to form the structure by use of a conventional dry etching device, since the structure has an asymmetrical saw blade shape. Thus, an ideal saw blade shape may not be formed and, accordingly, actual efficiency of upward emission may be lowered.

The above problem does not occur in the grating structure disclosed in Non-Patent Literature 3; however, another problem relating to adoption of deep grooves occurs therein. Specifically, as shown in FIG. 2, a gap 240 of a deep groove suddenly appears in front of light 250 when the light 250 enters the grating part from the side of the waveguide of the core layer 214; thus, there is tendency that the input light is reflected at the position from where the grating starts, and a large amount of reflected light $P_{ref}$ is thereby generated. As a result, upward emission efficiency $\eta_{up}$ may be lowered, and/or noise may be generated in an optical circuit connected to an upstream side of the grating. In a prior-art technique, for solving the above problem, an apodizing process is applied to make a groove positioned at the beginning part of the grating, which is connected to a waveguide, to be narrow, shallow, or the like. However, it is necessary to finely process the groove for obtaining sufficient effect in terms of reduction of reflection; so that it is difficult to manufacture, with a high yield, gratings which respectively have small input reflection losses.

CITATION LIST

Non Patent Literature

NPL 1: R. M. Emmons and D. G. Hall, "Buried oxide silicon-on-insulator structures. 2. Waveguide grating couplers," JOURNAL OF QUANTUM ELECTRONICS, Vol. 28, No. 1, JULY 1992, pp. 164-175
NPL 2: K. C. Chang and T. Tamir, "Simplified approach to surface-wave scattering by balazed dielectric gratings," APPLIED OPTICS, Vol. 19, No. 2, January 1980, pp. 282-288
NPL 3: D. Vermeulen, S. Selvaraja, P. Verheyen, G. Lepage, W. Bogaerts, and G. Roelkens, "High-efficiency silicon-on-insulator fiber-to-chip grating couplers using a silicon overlay" in Group IV Photonics, 2009

SUMMARY OF INVENTION

Technical Problem

As explained above, in the case that a basic shallow grating structure is simply adopted, there is a problem that the degree of the upward emission efficiency obtainable is insufficient due to the operation principle of the structure thereof; and, in the case that an asymmetrical grating structure which is highly efficient according to the operation principle of the structure thereof is adopted, there is a problem that manufacturing of the structure is difficult. Further, in the case that a deep grating structure which is highly efficient according to the operation principle of the structure thereof is adopted, there is a problem that a reflection loss, that is due to large structural discontinuity at the beginning part of the grating, is large. For solving problems relating operation principles, manufacturing techniques, and occurrence of reflection loss that are based on prior-art grating structures, the present invention provides a grating structure which is to be used in a grating coupler, and which is highly efficient according to an operation principle thereof, is easy to be manufactured, and reduces occurrence of reflection loss.

Solution to Problem

For solving the above problems, a grating structure according to the present invention comprises: a core layer which has a top surface on which a periodic concavity and convexity part is formed; a first upper cladding layer which is in contact with the top surface of the core layer; a second upper cladding layer which is in contact with a top surface of the first upper cladding layer; and a first lower cladding layer which is in contact with a bottom surface of the core layer. Concavities in the concavity and convexity part are filled with a material which is the same as that of the first upper cladding layer. A refractive index of a material forming the core layer is larger than any of refractive indexes of materials of the first upper cladding layer, the second upper cladding layer, and the first lower cladding layer. The refractive index of the material of the first upper cladding layer is larger than the refractive index of the material of the second upper cladding layer. A thickness from a top surface of a convexity in the concavity and convexity part to the top surface of the first upper cladding layer is that in a range of length determined by subtracting, from a wavelength of light in the material forming the first upper cladding layer multiplied by $((2m_1-1)/4\pm\frac{1}{8})$ (wherein $m_1$ is a positive integer), a depth of the concavity and convexity part multiplied by $\frac{1}{2}$, wherein the light is that inputted/outputted to/from the grating coupler. In the present structure, the material of the first upper cladding layer may be silicon nitride or silicon oxide nitride.

Further, another grating structure according to the present invention comprises: a core layer which has a top surface on which a periodic concavity and convexity part is formed; a first upper cladding layer which is in contact with the top surface of the core layer; a second upper cladding layer which is in contact with a top surface of the first upper cladding layer; a third upper cladding layer which is in contact with a top surface of the second upper cladding layer; and a first lower cladding layer which is in contact with a bottom surface of the core layer. Concavities in the concavity and convexity part are filled with a material which is the same as that of the first upper cladding layer. A refractive index of a material forming the core layer is larger than any of refractive indexes of materials of the first upper cladding layer, the third upper cladding layer, and the first lower cladding layer. The refractive index of the material of the second upper cladding layer is larger than any of the refractive indexes of materials of the first upper cladding layer and the third upper cladding layer. A thickness from a top surface of a convexity in the concavity and convexity part to the top surface of the first upper cladding layer is that in a range of length determined by multiplying, by $(m_2/2\pm\frac{1}{8})$ (wherein $m_2$ is a positive integer), a wavelength of light in the material forming the first upper cladding layer, wherein the light is that inputted/outputted to/from the grating coupler, or in a range of length determined by subtracting, from the wavelength multiplied by $(m_2/2\pm\frac{1}{8})$, a depth of the concavity and convexity part multiplied by $\frac{1}{2}$. A thickness of the second upper cladding layer is that determined by multiplying, by $((2m_3-1)/4\pm\frac{1}{8})$ (wherein $m_3$ is a positive integer), a wavelength of light in the material forming the second upper cladding layer, wherein the light is that inputted/outputted to/from the grating coupler. In the present structure, the material of the second upper cladding layer may be silicon nitride or silicon oxide nitride or silicon.

In these grating structures according to the present invention, a distance from a bottom surface of a concavity in the concavity and convexity part to the bottom surface of the core layer may be that in a range of length determined by subtracting, from a wavelength of light in the material forming the core layer multiplied by $(\frac{1}{2}\pm\frac{1}{8})$, a depth of the concavity multiplied by $\frac{1}{2}$.

Further, a thickness of the first lower cladding layer may be that determined by multiplying, by $((2m_4-1)/4\pm\frac{1}{8})$ (wherein $m_4$ is a positive integer), a wavelength of light in the material forming the first lower cladding layer, wherein the light is that inputted/outputted to/from the grating coupler.

Further, a depth of the concavity and convexity part may be equal to or less than a wavelength of light in the material forming the core layer multiplied by $\frac{1}{8}$, wherein the light is that inputted/outputted to/from the grating coupler.

A method for manufacturing a grating coupler according to the present invention comprises steps for: forming a photoresist pattern on a core layer positioned above a first lower cladding layer, wherein openings are formed at positions on the photoresist pattern that correspond to those of concavities of a grating which is to be made; forming a concavity and convexity part of the grating, by using the photoresist pattern as a mask and etching a surface of the core layer; removing the remaining photoresist; forming a photoresist pattern on the core layer, wherein the photoresist pattern corresponds to a shape of the grating coupler which is to be manufactured; performing dry etching to etch up to a surface of the first lower cladding layer; removing the remaining photoresist; stacking a first upper cladding layer on the core layer; forming a photoresist pattern on the first upper cladding layer, wherein the photoresist pattern covers a part corresponding to that of the concavity and convexity part of the grating; using the photoresist pattern as a mask and applying dry etching to the first upper cladding layer, to leave the first upper cladding layer on the concavity and convexity part of the grating; removing the remaining photoresist; and stacking a second upper cladding layer on the first upper cladding layer and the core layer. A refractive index of a material forming the core layer is larger than any of refractive indexes of materials of the first upper cladding layer, the second upper cladding layer, and the first lower cladding layer. The refractive index of the material of the first upper cladding layer is larger than the refractive index of the material of the second upper cladding layer. A thickness from a top surface of a convexity in the concavity and convexity part to the top surface of the first upper cladding layer is that in a range of length determined by subtracting, from a wavelength of light in the material forming the first upper cladding layer multiplied by $((2m_1-1)/4\pm\frac{1}{8})$ (wherein $m_1$ is a positive integer), a depth of the concavity and convexity part multiplied by $\frac{1}{2}$, wherein the light is that inputted/outputted to/from the grating coupler.

Further, another method for manufacturing a grating coupler according to the present invention comprises steps for: forming a photoresist pattern on a core layer positioned above a first lower cladding layer, wherein openings are formed at positions on the photoresist pattern that correspond to those of concavities of a grating which is to be made; forming a concavity and convexity part of the grating, by using the photoresist pattern as a mask and etching a surface of the core layer; removing the remaining photoresist; forming a photoresist pattern on the core layer, wherein the photoresist pattern corresponds to a shape of the grating coupler which is to be manufactured; performing dry etching to etch up to a surface of the first lower cladding layer; removing the remaining photoresist; stacking a first upper cladding layer on the core layer; stacking a second upper cladding layer on the first upper cladding layer; forming a photoresist pattern on the second upper cladding layer, wherein the photoresist pattern covers a part corresponding to that of the concavity and convexity part of the grating; using the photoresist pattern as a mask and applying dry etching to the second upper cladding layer, to leave the second upper cladding layer on the concavity and convexity part of the grating; removing the remaining photoresist; and stacking a third upper cladding layer on the first upper cladding layer and the second upper cladding layer. A refractive index of a material forming the core layer is larger than any of refractive indexes of materials of the first upper cladding layer, the second upper cladding layer, the third upper cladding layer, and the first lower cladding layer. The refractive index of the material of the second upper cladding layer is larger than any of the refractive indexes of the materials of the first upper cladding layer and the third upper cladding layer. A thickness from a top surface of a convexity in the concavity and convexity part to the top surface of the first upper cladding layer is that in a range of length determined by multiplying, by $(m_2/2\pm\frac{1}{8})$ (wherein $m_2$ is a positive integer), a wavelength of light in the material forming the first upper cladding layer, wherein the light is that inputted/outputted to/from the grating coupler, or in a range of length determined by subtracting, from the wavelength multiplied by $(m_2/2\pm\frac{1}{8})$, a depth of the concavity and convexity part multiplied by $\frac{1}{2}$. A thickness of the second upper cladding layer is that determined by multiplying, by $((2m_3-1)/4\pm\frac{1}{8})$ (wherein $m_3$ is a positive integer), a wavelength of light in the material forming the second upper cladding layer, wherein the light is that inputted/outputted to/from the grating coupler.

Advantageous Effects of Invention

According to the present invention, it is possible to provide a grating structure, which is highly efficient and easy to manufacture, for a grating coupler.

DESCRIPTION OF EMBODIMENTS

In the following description, embodiments of grating structures according to the present invention will be explained with reference to the figures. In this regard, note that the scope of the technique of the present invention is not limited by the embodiments, and that the scope should be interpreted on the basis of descriptions in the claims. Further, note that, although embodiments wherein light is outputted from a grating element to the outside will be mainly explained in the following description, embodiments wherein light is inputted from the outside to a grating element can be realized by using constructions similar to the constructions explained below.

Figure 1:
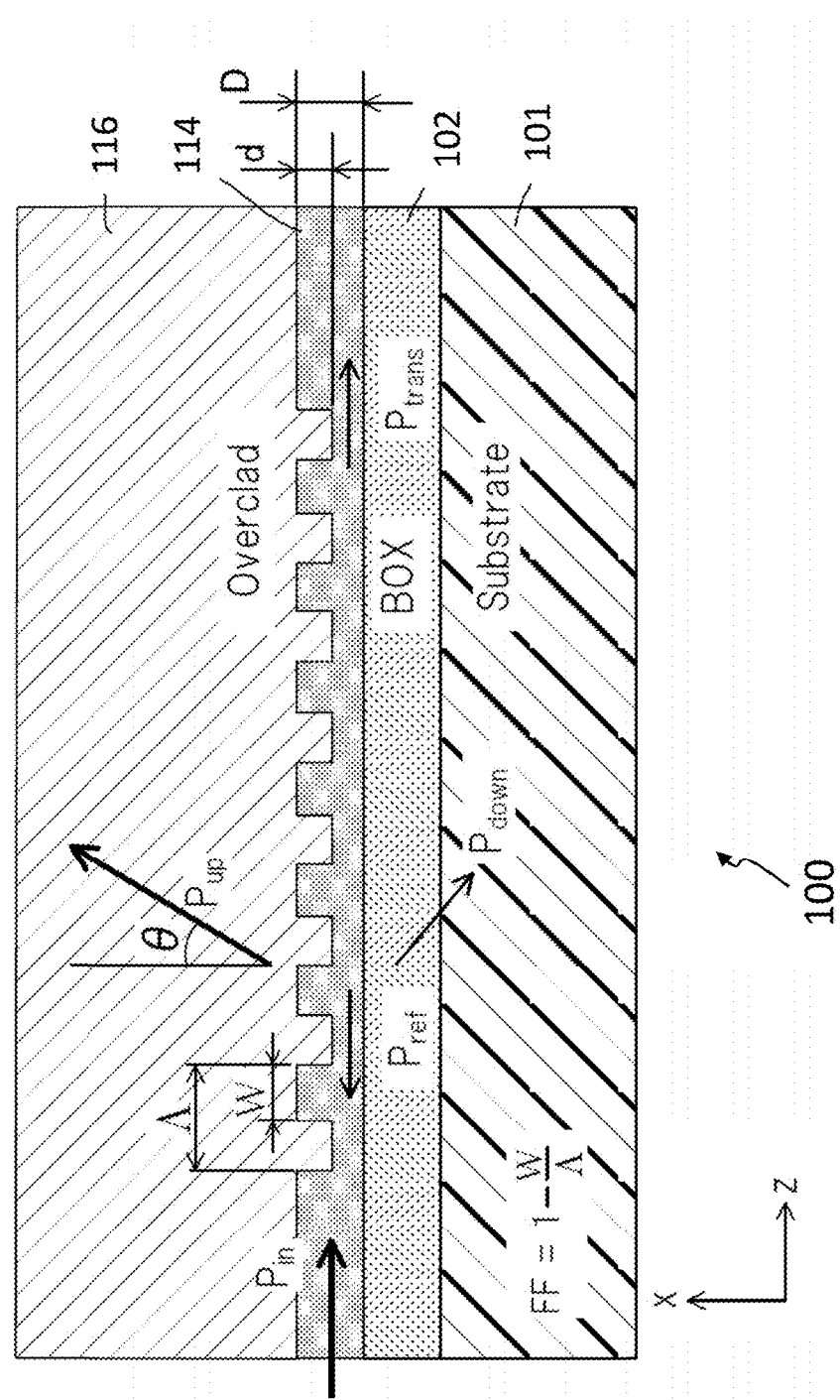
FIG. 1 is a schematic cross-section view of a grating part of an example grating coupler.
Figure 2:
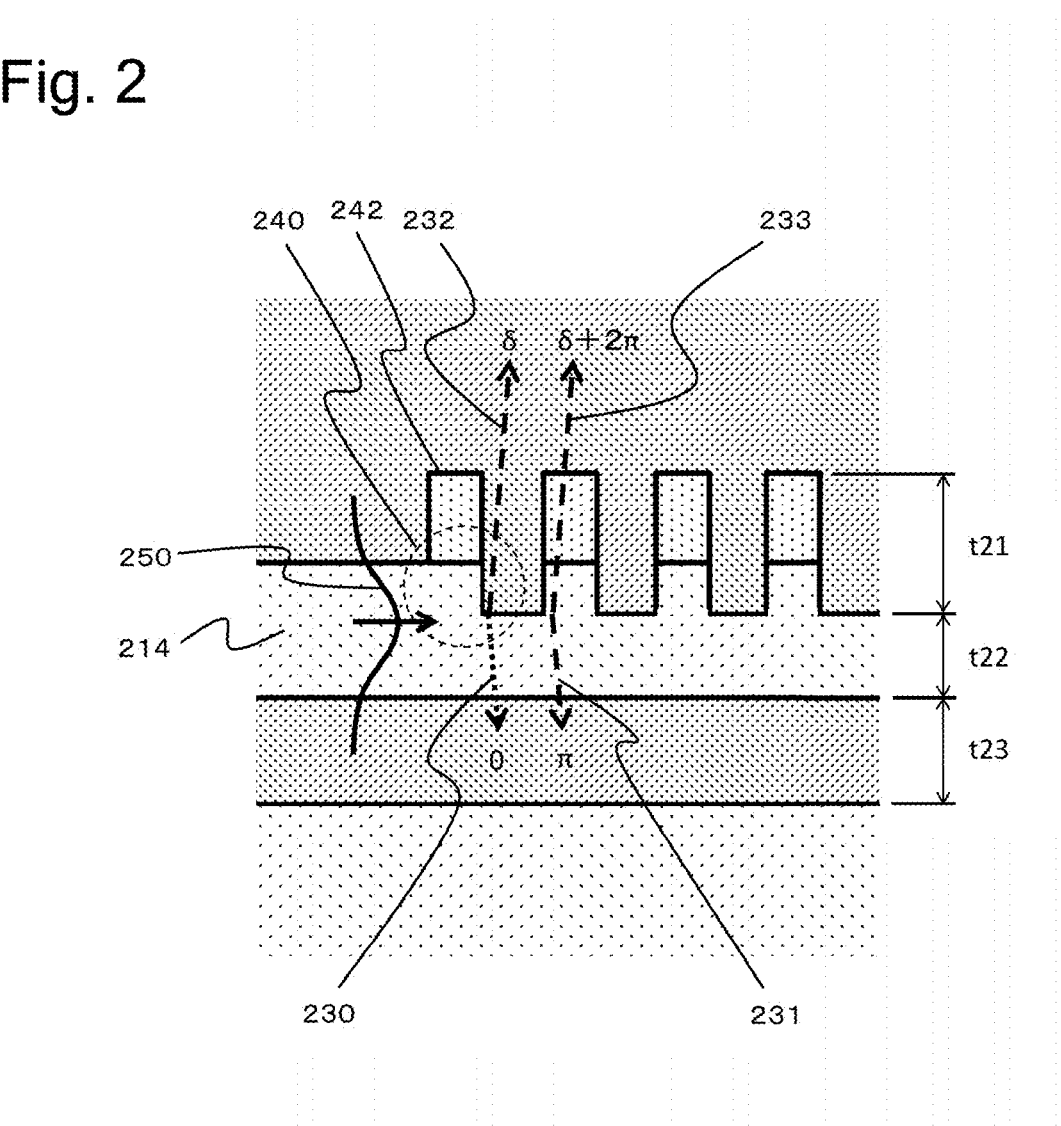
FIG. 2 is a schematic figure of a cross-section of a grating, and is used for explaining an operation of a grating disclosed in Non-Patent Literature 3.
Figure 3A:
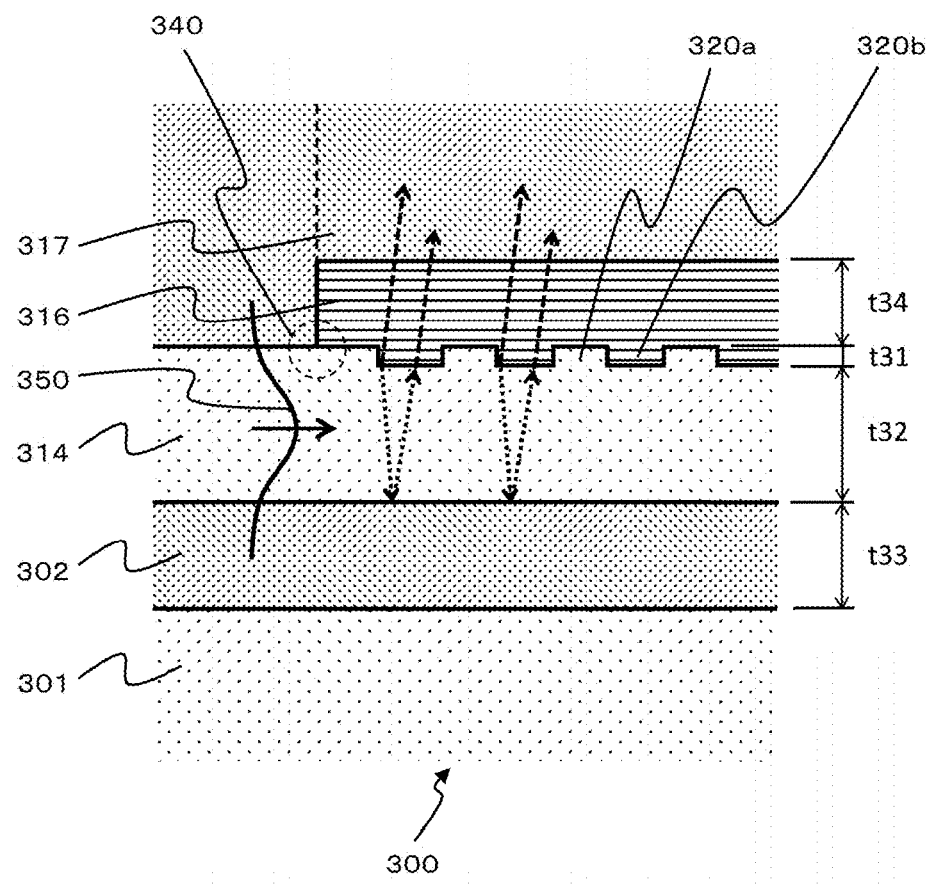
FIG. 3A is a schematic cross-section view showing a grating structure according to a first embodiment of the present invention.

FIG. 3A is a schematic cross-section view showing a construction of a first embodiment of a grating structure according to the present invention. As shown in FIG. 3A, a grating structure 300 according to the first embodiment comprises: a core layer 314 which has a top surface on which a periodic concavity and convexity part 320a and 320b is formed; a first upper cladding layer 316 which is in contact with the top surface of the core layer 314; a second upper cladding layer 317 which is in contact with a top surface of the first upper cladding layer 316; a first lower cladding layer 302 which is in contact with a bottom surface of the core layer 314; and a second lower cladding layer 301 which is in contact with a bottom surface of the first lower cladding layer 302. The concavities 320b in the periodic concavity and convexity part on the top surface of the core layer 314 are filled with a material which is the same as that of the first upper cladding layer 316. A refractive index of a material forming the core layer 314 is larger than any of refractive indexes of materials of the first upper cladding layer 316, the second upper cladding layer 317, and the first lower cladding layer 302. The refractive index of the material of the first upper cladding layer 316 is larger than the refractive index of the material of the second upper cladding layer 317. A thickness t34 from a top surface of a convexity 320a on the top surface of the core layer 314 to the top surface of the first upper cladding layer 316 is that in a range of length determined by subtracting, from a wavelength of light in the material forming the first upper cladding layer 316 multiplied by $((2m_1-1)/4 \pm \frac{1}{8})$ (wherein $m_1$ is a positive integer), a depth t31 of the concavity and convexity part 320a and 320b on the top surface of the core layer 314 multiplied by ½, wherein the light is that inputted/outputted to/from a grating coupler. In FIG. 3A, symbol t32 denotes a thickness from a bottom surface of a concavity 320b on the top surface of the core layer 314 to the bottom surface of the core layer 314. Symbol t33 denotes a thickness of the first lower cladding layer 302.

In the case that an SOI wafer is used, a material of each of the core layer 314 and the second lower cladding layer 301 may be silicon (Si), a material of the first upper cladding layer 316 may be silicon nitride ($Si_3N_4$), and a material of each of the second upper cladding layer 317 and the first lower cladding layer 302 may be silicon dioxide ($SiO_2$), for example.

An operation of the grating structure 300 according to the first embodiment will be described below.

Inputted light 350 is scattered by the periodic concavity and convexity part 320a and 320b on the surface of the core layer 314. A part of the inputted light 350 is upwardly emitted directly; and another part of the inputted light is downwardly scattered first, a part of the downwardly scattered light is reflected and returned by the bottom surface of the core layer 314, and the returned light is upwardly emitted via the top surface of the core layer 314. Accordingly, upward emission efficiency can be improved by increasing a transmittance of the top surface of the core layer 314.

Thus, in the first embodiment, the first upper cladding layer 316 and the second upper cladding layer 317 are formed on the core layer 314. The first upper cladding layer 316 is made to function as an antireflection film for the top surface of the core layer 314, by appropriately adjusting the refractive index and the thickness of the first upper cladding layer 361. In the case that the material of the core layer 314 is Si (the refractive index: $n_{Si}$) and the material of the second upper cladding layer 317 is $SiO_2$ (the refractive index: $n_{SiO2}$), the optimum refractive index $n_{AR}$ of a material for the first upper cladding layer 316 is given by $n_{AR}=(n_{Si}*n_{SiO2})^{1/2}$.

In the case of light having a wavelength of 1.31 μm, it is calculated that $n_{AR}=2.25$; thus, if the first upper cladding layer 316 is deposited by use of silicon nitride having a refractive index of 2.0, a certain degree of antireflection effect, although not perfect, can be obtained.

Figure 4:
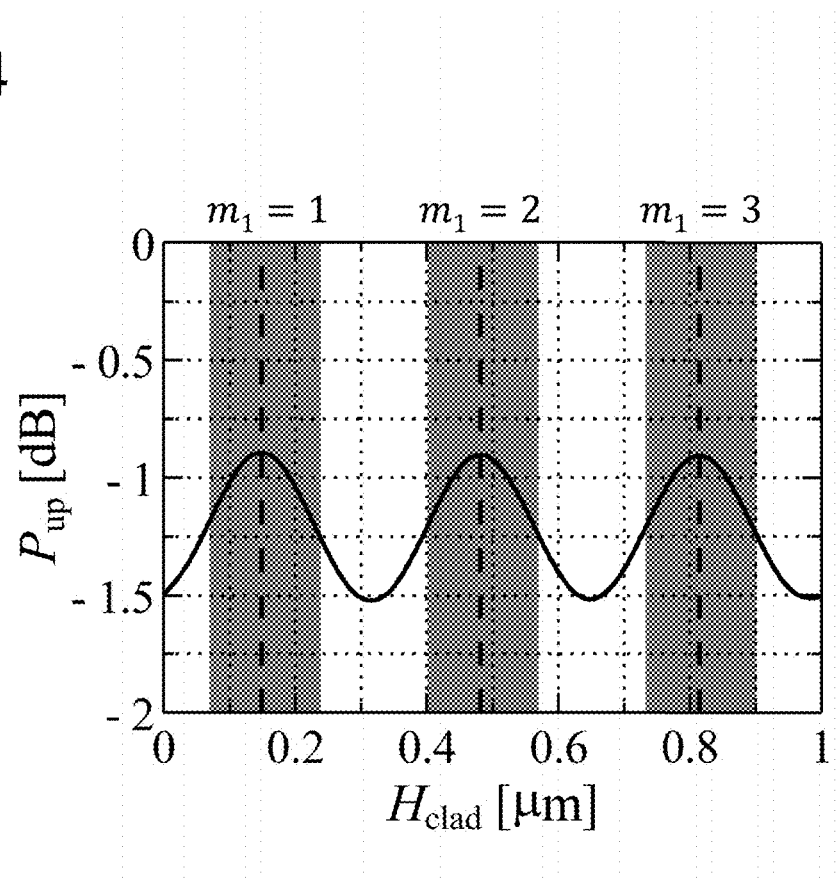
FIG. 4 is a characteristic chart showing dependency of upward emission efficiency $P_{up}$ on thickness $H_{clad}$ of a first upper cladding layer 316 in the grating structure shown in FIG. 3A.

FIG. 4 is a characteristic chart showing dependency of upward emission efficiency $P_{up}$ on thickness $H_{clad}$ of the first upper cladding layer 316 in the grating structure shown in FIG. 3A. The maximum value of $P_{up}$ shown in FIG. 4 is the upward emission efficiency that is obtained when a maximal degree of effect derived from the first upper cladding layer 316 is obtained. The minimum value of $P_{up}$ shown in FIG. 4 is equal to the upward emission efficiency in the case that a prior-art grating structure, which does not comprise the first upper cladding layer 316, is used. Thus, it is understandable form FIG. 4 that the upward emission efficiency is improved by approximately 0.68 dB by adopting the first embodiment.

In prior art, it is disclosed that the optimum thickness of a single-layer antireflection film deposited on a flat surface should be set to an odd-number multiple of ¼ of a wavelength in a material forming the film. Then, according to the disclosure, the thickness of the first upper cladding layer 316 should be 0.166 μm ($m_1=1$), 0.497 μm ($m_1=2$), or 0.829 μm ($m_1=3$). However, the inventors of the invention relating to the subject application analyzed the characteristic chart in FIG. 4, and found that the film thickness that actually makes the value of $P_{up}$ the maximum is smaller than the above values. Further, the inventors of the invention relating to the subject application researched the cause of the above matter, and found that, due to existence of the concavity and convexity part 320a and 320b of the grating on the surface of the core layer 314, the optical interface between the core layer 314 and the first upper cladding layer 316 is shifted to a position at approximately the middle of the depth of the concavity and convexity part 320a and 320b in actuality. Based on this new finding, the optimum thickness $H_{clad}$ of the first upper cladding layer 316 comprising silicon nitride is given by the following formula.

[Math 1]

$$H_{clad} = \frac{\lambda_0}{n_{SiN}\cos\varphi_{SiN}}\left\{\frac{2m_1-1}{4}\right\} - \frac{d}{2} \quad \text{(Formula 5)}$$

Regarding the above formula, the wavelength of light in a vacuum is denoted by $\lambda_0$, the refractive index of silicon nitride is denoted by $n_{SiN}$, a slope of upwardly emitted light from the vertical is denoted by $\varphi_{SiN}$, the depth of the concavity and convexity part 320a and 320b of the grating is denoted by d (this corresponds to t31 in FIG. 3A), and $m_1$ denotes a positive integer. The term of $\cos \varphi_{SiN}$ is a correction term that is based on the state that the optical axis of light emitted from the grating is tilted from the vertical. The value of this correction term is approximately 1 under a usual use condition of the grating coupler; thus, there is no problem to neglect the term. As proved by Formula 5, it is preferable to make the thickness of the first upper cladding layer 316 to be thinner than the thickness taught in the prior art by ½ of the depth of the concavity and convexity part 320a and 320b.

As implied in FIG. 4, a certain degree of upward emission efficiency can be obtained, even if $H_{clad}$ is slightly shifted from the value given by Formula 5. That is, the inventors of the invention relating to the subject application found that there is a range of $H_{clad}$ by which effect for improving the upward emission efficiency can be obtained by use of the first embodiment; and also found that the range can be given by the following formula.

[Math 2]

$$\frac{\lambda_0}{n_{SIN}\cos\varphi_{SIN}}\left\{\frac{2m_1-1}{4}-\frac{1}{8}\right\}-\frac{d}{2} \le$$

$$H_{clad} \le \frac{\lambda_0}{n_{SIN}\cos\varphi_{SIN}}\left\{\frac{2m_1-1}{4}+\frac{1}{8}\right\}-\frac{d}{2}$$

(Formula 6)

When $H_{clad}$ is in the range shown by Formula 6, i.e., when the thickness of the first upper cladding layer 316 is in the range that spans, from the optimum thickness as the center, approximately ±⅛ of the wavelength in the material forming the first upper cladding layer 316, it is possible to obtain half or more of the effect obtainable by adoption of the first upper cladding layer 316.

Note that the material of the first upper cladding layer 316 is not limited to silicon nitride, and the material may be silicon oxide nitride or a different material, and the material should be appropriately selected according to an available film-forming device.

In the first embodiment, the upward emission efficiency $\eta_{up}$ can be improved without making the depth of the concavity and convexity part 320a and 320b on the surface of the core layer 314 to be especially deep; thus, reflection loss due to structural discontinuity at the beginning part of the grating can be reduced.

Next, as a tangible example, a method for manufacturing a grating coupler, in which the grating structure 300 of the first embodiment is adopted, will be explained.

Figure 3B:
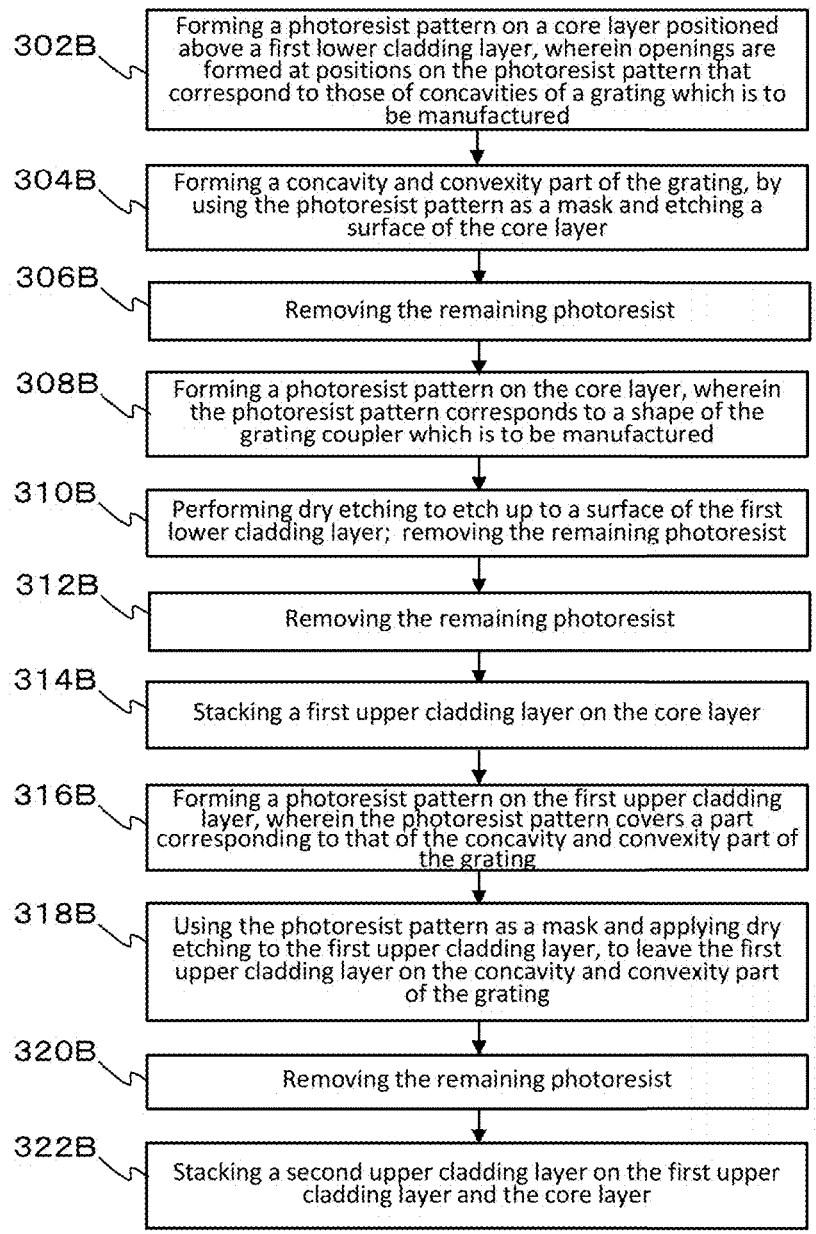
FIG. 3B shows a flowchart of a method for manufacturing a grating coupler which comprises the grating structure shown in FIG. 3A.

FIG. 3B shows a flowchart of a method for manufacturing a grating coupler which comprises the grating structure 300 shown in FIG. 3A. An SOI wafer is used as a wafer used for manufacturing the grating coupler. Regarding thicknesses of layers in the SOI wafer, a thickness of a buried oxide film (a silicon dioxide film) which corresponds to the first lower cladding layer 302 may be set to 2972 nm, and a thickness of an SOI layer (a Si layer) which corresponds to the core layer 314 may be set to 200 nm. First, in step 302B, a photoresist pattern is formed on the core layer (SOI layer) 304 positioned above the first lower cladding layer 302 by lithography, wherein openings are formed at positions on the photoresist pattern that correspond to those of concavities of a grating which is to be made. In step 304B, a concavity and convexity part of the grating is formed by using the photoresist pattern as a mask and etching a surface of the core layer 314 by 35 nm, for example. In step 306B, the remaining photoresist is removed. Next, in step 308B, a photoresist pattern is again formed on the core layer 314, wherein the photoresist pattern corresponds to a shape and waveguides of the grating coupler which is to be manufactured and to other optical devices. In step 310B, dry etching is applied to etch the core layer 314 up to a surface of the first lower cladding layer 302 (buried oxide film) positioned below the core layer 314. In step 312B, the remaining photoresist is removed. Regarding a condition of the dry etching, it is possible to use a condition that etching speed for silicon is faster than that for silicon dioxide. Next, in step 314B, by using a plasma-enhanced chemical vapor deposition device, the first upper cladding layer 316 (for example, a silicon nitride film) is stacked, for example, by 166 nm on the core layer 314. In step 316B, a photoresist pattern is formed on the first upper cladding layer 316, wherein the photoresist pattern covers a part corresponding to that of the concavity and convexity part of the grating. In step 318B, the photoresist pattern is used as a mask and dry etching is applied to the first upper cladding layer 316 (the silicon nitride film), to leave the first upper cladding layer 316 on the concavity and convexity part of the grating. In step 320B, the remaining photoresist is removed. Regarding a condition of the dry etching, a condition that etching speed for silicon nitride is faster than that for silicon may be used. Finally, in step 322B, a second upper cladding layer 317 (silicon dioxide) is stacked, for example, by 2000 nm on the first upper cladding layer 316 and the core layer 314; and, in this manner, an optical device including the grating coupler can be completed.

The method for manufacturing the grating coupler according to the present example is in the scope of a method that can be practiced in a general CMOS manufacturing line and, thus, manufacturing is easy.

As shown in the present example, in the first embodiment, the first upper cladding later 316 is formed by using a material (for example, silicon nitride, $Si_3N_4$) which has a refractive index larger than that of a material (for example, silicon dioxide, $SiO_2$) forming the second upper cladding layer 317. On the other hand, in many cases, it may be desirable that a material of a cladding layer positioned above a waveguide, which is used to input light into the grating part, is the same as a material (for example, silicon dioxide, $SiO_2$) of the second upper cladding layer 317.

In the first embodiment, there may be a problem that, when the light 350 is inputted to the grating from the waveguide, a leaked part of a field of the light, that is leaked from a top part of the waveguide, collides with the end 340 of the first upper cladding layer 316 as shown in FIG. 3A, and scattering loss and/or reflection loss is incurred thereby and the upward emission efficiency is lowered as a result thereof. Next, another example which can solve the above problem will be explained.

Figure 5A:
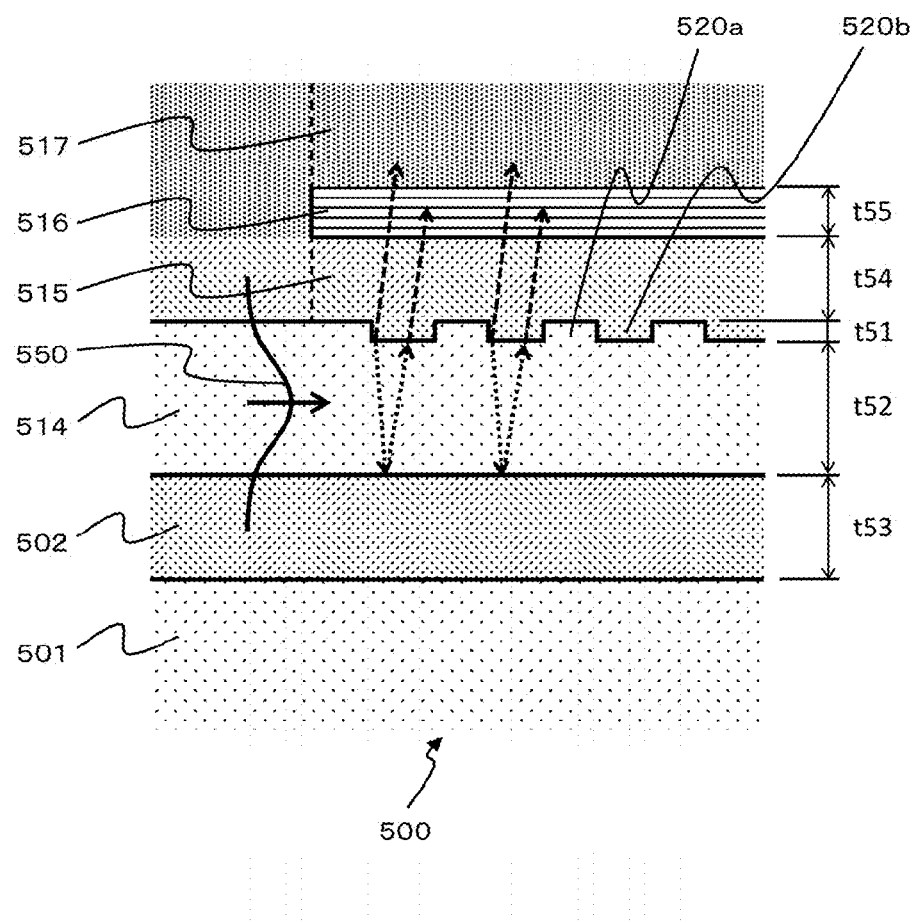
FIG. 5A is a schematic cross-section view showing a grating structure according to a second embodiment of the present invention.

FIG. 5A is a schematic cross-section view showing a construction of a second embodiment of a grating structure according to the present invention. As shown in FIG. 5A, a grating structure 500 according to this embodiment comprises a grating structure for a grating coupler, and the grating structure comprises: a core layer 514 which has a top surface on which a periodic concavity and convexity part 520a and 520b is formed; a first upper cladding layer 515 which is in contact with the top surface of the core layer 514; a second upper cladding layer 516 which is in contact with a top surface of the first upper cladding layer 515; a third upper cladding layer 517 which is in contact with a top surface of the second upper cladding layer 516; a first lower cladding layer 502 which is in contact with a bottom surface of the core layer 514; and a second lower cladding layer 501 which is in contact with a bottom surface of the first lower cladding layer 502. The concavities 520b in the periodic concavity and convexity part on the top surface of the core layer 514 are filled with a material which is the same as that of the first upper cladding layer 515; and a refractive index of a material forming the core layer 514 is larger than any of refractive indexes of materials of the first upper cladding layer 515, the third upper cladding layer 517, and the first lower cladding layer 502. The refractive index of the material of the second upper cladding layer 516 is larger than any of the refractive indexes of the materials of the first upper cladding layer 515 and the third upper cladding layer 517. A thickness t54 from a top surface of a convexity 520a on the top surface of the core layer 514 to the top surface of the first upper cladding layer 515 is that in a range of length determined by multiplying, by ($m_2/2\pm\frac{1}{8}$) (wherein $m_2$ is a positive integer), a wavelength of light in the material forming the first upper cladding layer 515, wherein the light is that inputted/outputted to/from a grating coupler, or in a range of length determined by subtracting, from the wavelength multiplied by ($m_2/2\pm\frac{1}{8}$), a depth t51 of the concavity and convexity part 520a and 520b on the top surface of the core layer 514 multiplied by ½. A thickness t55 of the second upper cladding layer 516 is that determined by multiplying, by (($2m_3-1)/4\pm\frac{1}{8}$) (wherein $m_3$ is a positive integer), a wavelength of light in the material forming the second upper cladding layer 516, wherein the light is that inputted/outputted to/from a grating coupler. In FIG. 5A, symbol t52 denotes a thickness from a bottom surface of a concavity 520b on the top surface of the core layer 514 to the bottom surface of the core layer 514. Symbol t53 denotes a thickness of the first lower cladding layer 502.

In the case that an SOI wafer is used in a manner similar to that in the case of the first embodiment, a material of each of the core layer 314 and the second lower cladding layer 501 may be silicon (Si), and a material of the first lower cladding layer 502 may be silicon dioxide ($SiO_2$). Unlike the case of the first embodiment, each of materials of the first upper cladding layer 515 and the third upper cladding layer 517 may be silicon dioxide, and a material of the second upper cladding layer 516 may be silicon nitride ($Si_3N_4$). As a result, the grating structure 500 according to the second embodiment comprises the construction such that a silicon-dioxide film is interposed between the core layer and the silicon-nitride film positioned directly above the core layer in the first embodiment.

An operation of the grating structure 500 according to the second embodiment will be described below.

It may appear that, in the grating structure 500 according to the second embodiment, the first upper cladding layer 515 and the second upper cladding layer 516 together form a two-layer antireflection film for the core layer 514; however, in actuality, the above interpretation of the appearance is incorrect. According to a prior-art technique, in the case of a two-layer antireflection film, the refractive index of the material of the first upper cladding layer 515 must be larger than that of the material of the second upper cladding layer 516; however, in the second embodiment, the refractive indexes are set in a manner different from the above manner.

The material of the first upper cladding layer 515 (for example, $SiO_2$) has a refractive index smaller than that of the material of the core layer 514 (for example, Si). Further, the thickness of the first upper cladding layer 515 is set to an integer multiple of ½ of a wavelength of light in the material forming the first upper cladding layer 515 (for example, $SiO_2$). As a result of the above setting, it optically appears, to the scattered light, as if the first upper cladding layer 515 does not exist in front thereof, wherein the scattered light refers to the light that is reflected by the bottom surface of the core 514, passes through the top surface of the core 514, and enters the first upper cladding layer 515. That is, the antireflection effect provided by the two layers, i.e., the first upper cladding layer 515 and the second upper cladding layer 516, is equivalent to the effect provided by the first embodiment.

A characteristic of the second embodiment is that the silicon-nitride cladding film, which is positioned directly above the core layer in the first embodiment, is separated from the core layer; and, further, regarding the material of the cladding layer directly above the core layer, the same material can be used for forming the upper part of the input waveguide part and the upper part of the grating part. As a result, as shown in FIG. 5A, when light 550 is inputted from the input waveguide part to the grating part, most of a leaked part of the field of light, that is leaked into the cladding layer in the upper part of the waveguide part, continuously moves through the same material (for example, $SiO_2$). Since most of the leaked part of the field of the light, that is leaked into the cladding layer in the upper part of the waveguide part, does not reach the second cladding layer 516 which is distant from the core layer 514, reflection loss at the end of the second cladding layer is rarely incurred. Thus, the problem in the first embodiment, i.e., scattering loss and/or reflection loss is incurred as a result of collision of guided light with the end of the upper cladding later, can be solved.

Figure 6:
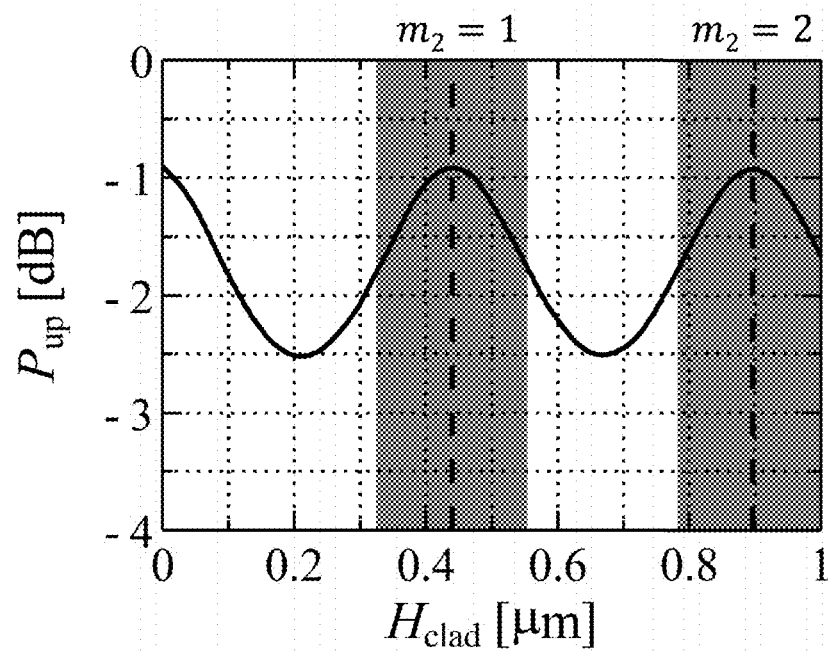
FIG. 6 is a characteristic chart showing dependency of upward emission efficiency $P_{up}$ on thickness $H_{clad}$ of a first upper cladding layer 515 in the grating structure shown in FIG. 5A.

FIG. 6 is a characteristic chart showing dependency of upward emission efficiency $P_{up}$ on thickness $H_{clad}$ of a first upper cladding layer 515. The maximum value of $P_{up}$ shown in FIG. 6 is the upward emission efficiency that is obtained when a maximal degree of effect derived from the first upper cladding layer 515 is obtained. The minimum value of $P_{up}$ shown in FIG. 6 is smaller than the upward emission efficiency in the case that a prior-art grating structure, which does not comprise the first upper cladding layer 515 and the second upper cladding layer 516, is used. The allowed range of thickness of the first upper cladding layer 515, that can improve the upward emission efficiency by use of the second embodiment, is in the range of approximately $\pm\frac{1}{8}$ of a wavelength of light in the material forming the first upper cladding layer 515.

The optimum thickness $H_{clad}$ of the first upper cladding layer 515 is given by the following formula.

[Math 3]

$$H_{clad} = \frac{\lambda_0}{n_{SiO_2}\cos\varphi_{SiO_2}}\left\{\frac{m_2}{2}\right\} - \frac{d}{2} \qquad \text{(Formula 7)}$$

In the case that the thickness of the first upper cladding layer 515 is shifted from the optimum thickness, the allowed range under a condition that the decreasing rate of the upward emission efficiency can be set to a value equal to or less than ¼ of the maximum value, i.e., the allowed range of $H_{clad}$ under a condition that the upward emission efficiency increases compared with, at least, that obtainable when the second embodiment is not adopted, is given by the following formula

[Math 4]

$$\frac{\lambda_0}{n_{SiO_2}\cos\varphi_{SiO_2}}\left\{\frac{m_2}{2} - \frac{1}{8}\right\} - \frac{d}{2} \leq \qquad \text{(Formula 8)}$$
$$H_{clad} \leq \frac{\lambda_0}{n_{SiO_2}\cos\varphi_{SiO_2}}\left\{\frac{m_2}{2} + \frac{1}{8}\right\} - \frac{d}{2}$$

Regarding the above formula, the refractive index of silicon dioxide is denoted by $n_{SiO_2}$, a slope of upwardly emitted light from the vertical in the silicon-dioxide film is denoted by $\varphi_{SiO_2}$, and $m_2$ denotes a positive integer. The term of $\cos\varphi_{SiO_2}$ is a correction term that is based on the state that the optical axis of light emitted from the grating is tilted from the vertical; and, since the value of this correction term is approximately 1 under a usual use condition of the grating coupler, the term may be neglected.

As would be understood from Formula 7 and Formula 8, the construction that the correction term d/2 (d corresponds to t51 in FIG. 5A) is added due to existence of the concavity and convexity part 520a and 520b on the top surface of the core layer 514 is not taught in prior art; and the above also applies to the first embodiment.

In this regard, in the case that the depth of the groove of the grating is larger than the distance from the bottom surface of the concavity and convexity part of the grating to the bottom surface of the core layer, i.e., in the case that d>t52, the error of the correction term itself becomes large; thus, the correction term is excluded from Formula 7 and Formula 8.

Figure 7:
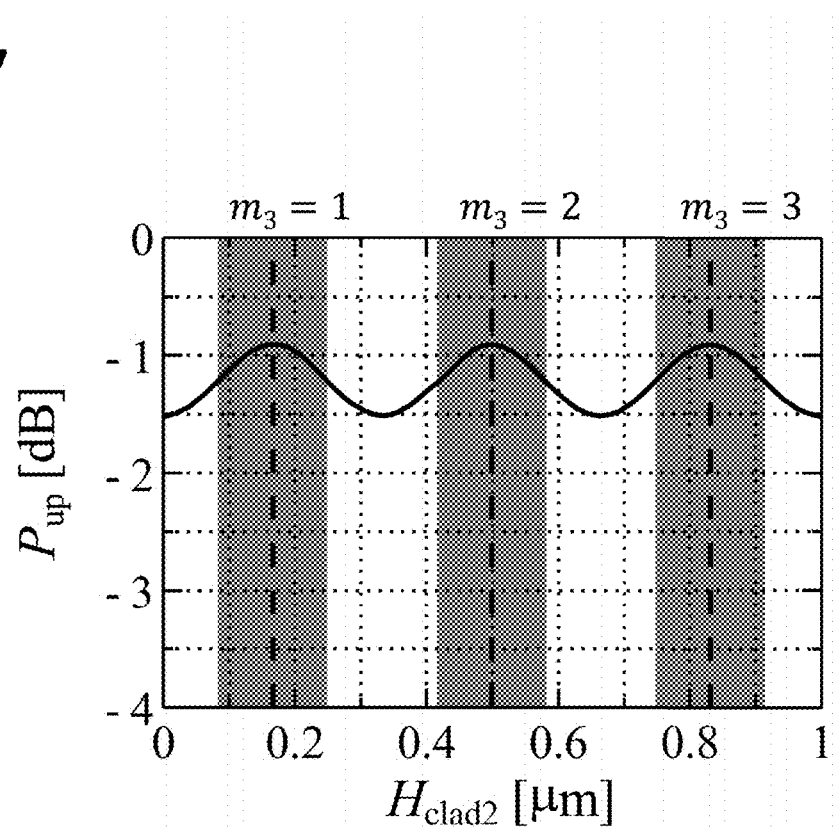
FIG. 7 is a characteristic chart showing dependency of upward emission efficiency $P_{up}$ on thickness $H_{clad}$ of a second upper cladding layer 516 in the grating structure shown in FIG. 5A.

FIG. 7 is a characteristic chart showing dependency of upward emission efficiency $P_{up}$ on thickness $H_{clad2}$ of a second upper cladding layer 516 in the grating structure shown in FIG. 5A. The maximum value of $P_{up}$ shown in FIG. 7 is the upward emission efficiency that is obtained when a maximal degree of effect derived from the second upper cladding layer 516 is obtained. The minimum value of $P_{up}$ shown in FIG. 7 is equivalent to the upward emission efficiency in the case that a prior-art grating structure, which does not comprise the first upper cladding layer 515 and the second upper cladding layer 516, is used. The allowed range of thickness of the second upper cladding layer 516, that can improve the upward emission efficiency by use of the second embodiment, is in the range of approximately ±⅛ of a wavelength of light in the material forming the second upper cladding layer 516.

The optimum thickness $H_{clad2}$ of the second upper cladding layer 516 is given by the following formula.

[Math 5]

$$H_{clad2} = \frac{\lambda_0}{n_{SiN}\cos\varphi_{SiN}}\left\{\frac{2m_3-1}{2}\right\} \quad \text{(Formula 9)}$$

As would be understood from Formula 9, since the second upper cladding layer 516 is stacked on the first upper cladding layer 515 which has the substantially flat top surface, the second upper cladding layer 514 is not affected by the concavity and convexity part 520a and 520b on the top surface of the core layer 514, so that the correction term d/2 is not added to the formula.

In the case that the thickness is shifted from the optimum thickness, and if it is suppose that the decreasing rate of the upward emission efficiency can be controlled to be equal to or less than a half of the maximum value, the allowed range of $H_{clad2}$ is given by the following formula.

[Math 6]

$$\frac{\lambda_0}{n_{SIN}\cos\varphi_{SIN}}\left\{\frac{2m_3-1}{4}-\frac{1}{8}\right\} \leq \quad \text{(Formula 10)}$$

$$H_{clad2} \leq \frac{\lambda_0}{n_{SIN}\cos\varphi_{SIN}}\left\{\frac{2m_3-1}{4}+\frac{1}{8}\right\}$$

Note that the material of the second upper cladding layer 516 is not limited to silicon nitride, and the material may be silicon oxide nitride, silicon, or a different material, and the material should be appropriately selected according to an available film-forming device.

Next, as a tangible example, a method for manufacturing a grating coupler that adopt the grating structure 500 of the second embodiment will be explained.

Figure 5B:
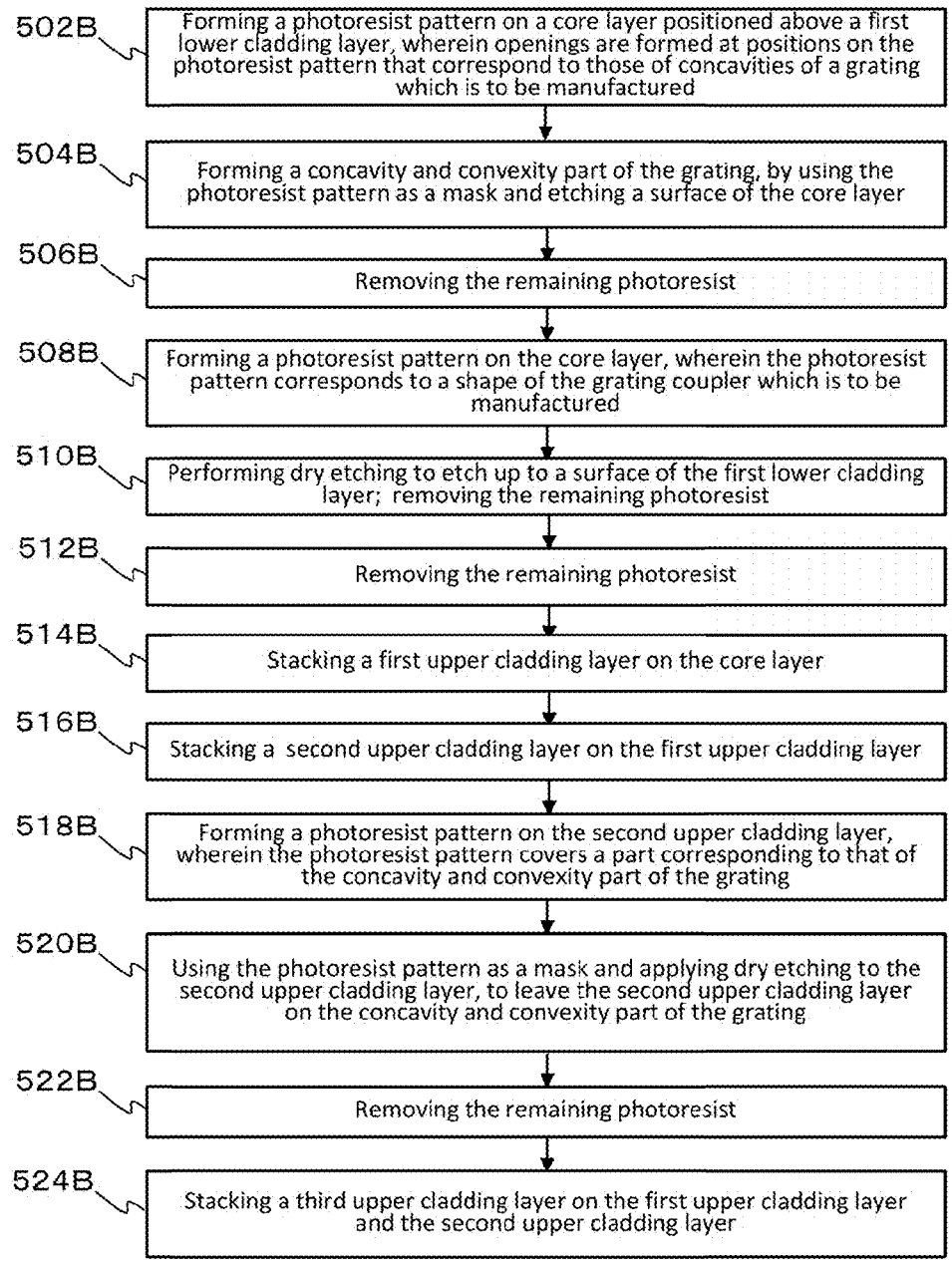
FIG. 5B shows a flowchart of a method for manufacturing a grating coupler which comprises the grating structure shown in FIG. 5A.

FIG. 5B shows a flowchart of a method for manufacturing a grating coupler which comprises the grating structure 500 shown in FIG. 5A. An SOI wafer is used as a wafer used for manufacturing the grating coupler. The SOI wafer comprises the first lower cladding layer 502 (a buried oxide film) and the core layer 514 (a SOI layer). In step 502B, a photoresist pattern is formed on the core layer 514 positioned above the first lower cladding layer 502 by lithography, wherein openings are formed at positions on the photoresist pattern that correspond to those of concavities of a grating which is to be made. In step 504B, a concavity and convexity part of the grating is formed by using the photoresist pattern as a mask and etching a surface of the core layer 514. In step 506B, the remaining photoresist is removed. Next, in step 508B, a photoresist pattern is formed on the core layer 514, wherein the photoresist pattern corresponds to a shape and waveguides of the grating coupler which is to be manufactured and to other optical devices. In step 510B, dry etching is applied to etch the core layer 514 up to a surface of the first lower cladding layer 502 positioned below the core layer 514. In step 512B, the remaining photoresist is removed. Regarding a condition of the dry etching, a condition that etching speed for silicon nitride is faster than that for silicon dioxide may be used. Thereafter, in the second embodiment, in step 514B, by using a plasma-enhanced chemical vapor deposition device, silicon dioxide is stacked, for example, by 457 nm as the first upper cladding layer 515 on the core layer 514. Further, in step 516B, by using a plasma-enhanced chemical vapor deposition device, silicon nitride is stacked, for example, by 166 nm as the second upper cladding layer 516 on the first upper cladding layer 515. In step 518B, a photoresist pattern is formed on the second upper cladding layer 516, wherein the photoresist pattern covers a part corresponding to that of the concavity and convexity part of the grating. In step 520B, the photoresist pattern is used as a mask and dry etching is applied to the second upper cladding layer 516, to leave the second upper cladding layer 516 on the concavity and convexity part of the grating. In step 522B, the remaining photoresist is removed. Finally, in step 524B, a third upper cladding layer 517 (silicon dioxide) is stacked, for example, by 2000 nm on the first upper cladding layer 515 and the second upper cladding layer 516; and, in this manner, a device including the grating coupler can be completed.

Regarding a condition of the dry etching, a condition that etching speed for silicon nitride is faster than that for silicon dioxide may be used; however, since the etched part is buried by silicon dioxide in step 524B, there will be no problem even if over-etching, by which the silicon-dioxide film below the silicon-nitride film is slightly etched, occurs in step 520B.

In the case of the first embodiment, if the silicon-nitride film is over-etched excessively during dry etching, the thickness of a part of the SOI layer, except for the part corresponding to the grating coupler, becomes thin; thus, it was a concern that the device characteristics might deteriorate. On the other hand, such a concern is unnecessary in the second embodiment; so that, in terms of a manufacturing process, the second embodiment is superior to the first embodiment.

In the case that silicon is used as the material of the core layer 514 and silicon dioxide is used as the material of the top layer in the cladding layers, it may be desirable to set the refractive index of the upper cladding layer in the middle, which functions as an antireflection film, to 2.25, in a precise sense, as described in the first half of this section. However, in the case that an optical device including the grating coupler is manufactured by use of a conventional CMOS manufacturing line, a material usable as the material of a high-refractive-index dielectric film is silicon nitride ($Si_3N_4$) having a refractive index of 2.0; and the refractive index obtainable thereby does not reach 2.25 that is desirable to be obtained. In such a case, the effect for improving the upward emission efficiency is relatively limited. Another embodiment, that will be explained next, comprises a grating stricture that can be used for solving this problem.

Figure 8:
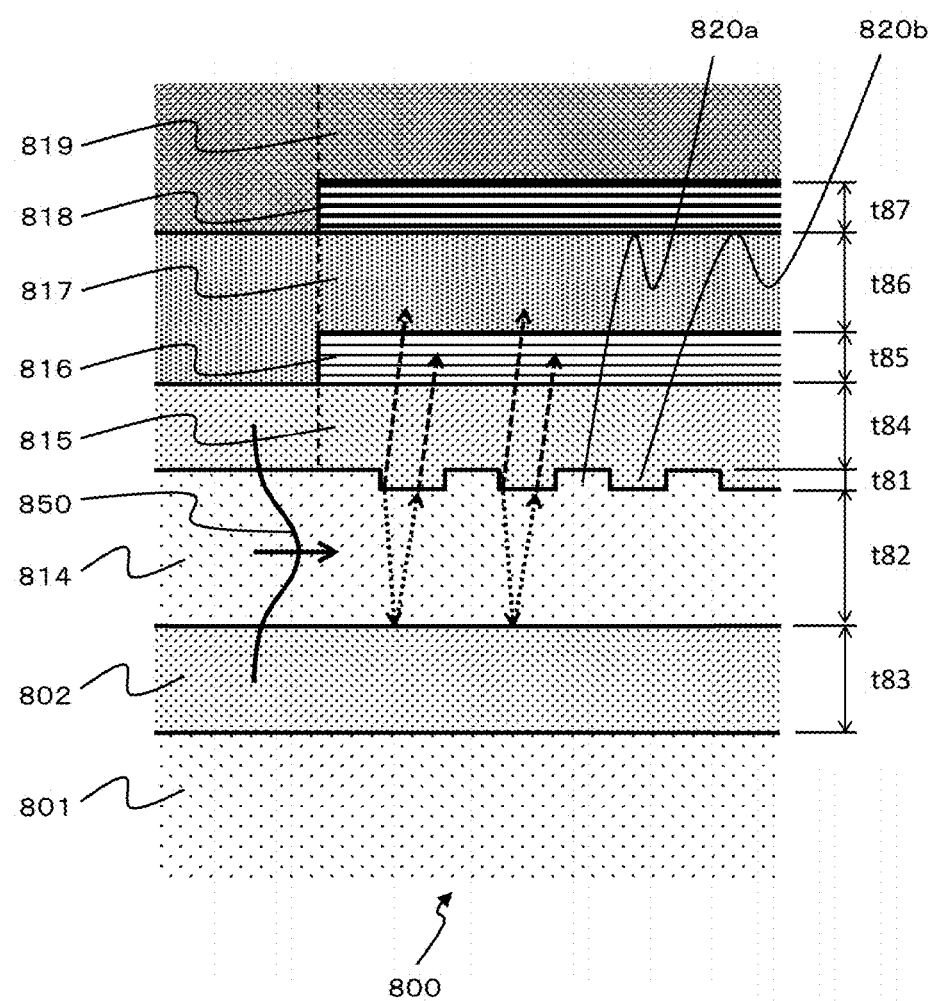
FIG. 8 is a schematic cross-section view showing a grating structure according to a third embodiment of the present invention.

FIG. 8 is a schematic cross-section view showing a construction of a third embodiment of a grating structure according to the present invention. As shown in FIG. 8, a grating structure 800 according to this embodiment comprises: a core layer 814 which has a top surface on which a periodic concavity and convexity part 820a and 820b is formed; a first upper cladding layer 815 which is in contact with the top surface of the core layer 814; a second upper cladding layer 816 which is in contact with a top surface of the first upper cladding layer 815; a third upper cladding layer 817 which is in contact with a top surface of the second upper cladding layer 816; a fourth upper cladding layer 818 which is in contact with a top surface of the third upper cladding layer 817; a fifth upper cladding layer 819 which is in contact with a top surface of the fourth upper cladding layer 818; a first lower cladding layer 802 which is in contact with a bottom surface of the core layer 814; and a second lower cladding layer 801 which is in contact with a bottom surface of the first lower cladding layer 802. The concavities 820b in the periodic concavity and convexity part on the top surface of the core layer 814 are filled with a material which is the same as that of the first upper cladding layer 815. A refractive index of a material forming the core layer 814 is larger than any of refractive indexes of materials of the first upper cladding layer 815, the third upper cladding layer 817, and the first lower cladding layer 802. The refractive index of the material of the second upper cladding layer 816 is larger than any of the refractive indexes of the materials of the first upper cladding layer 815 and the third upper cladding layer 817. The refractive index of the material of the fourth upper cladding layer 818 is larger than any of the refractive indexes of the materials of the third upper cladding layer 817 and the fifth upper cladding layer 819. A thickness t84 from a top surface of a convexity 820a on the top surface of the core layer 814 to the top surface of the first upper cladding layer 815 is that in a range of length determined by multiplying, by ($m_2/2\pm\frac{1}{8}$) (wherein $m_2$ is a positive integer), a wavelength of light in the material forming the first upper cladding layer 815, wherein the light is that inputted/outputted to/from a grating coupler, or in a range of length determined by subtracting, from the wavelength multiplied by ($m_2/2\pm\frac{1}{8}$), a depth t81 of the concavity and convexity part 820a and 820b on the top surface of the core layer 814 multiplied by ½. A thickness t85 of the second upper cladding layer 816 is that determined by multiplying, by (($2m_3-1)/4\pm\frac{1}{8}$) (wherein $m_3$ is a positive integer), a wavelength of light in the material forming the second upper cladding layer 816, wherein the light is that inputted/outputted to/from a grating coupler. As shown in FIG. 8, the grating structure 800 according to this embodiment comprises the fourth upper cladding layer 818 and the fifth upper cladding layer 819, in addition to the second upper cladding layer 516 and the third upper cladding layer 517 in the second embodiment shown in FIG. 5A; thus, this embodiment comprises a structure having two or more layers of antireflection films. For example, as shown in FIG. 8, in the case of a construction wherein the fourth upper cladding layer 818, which has a refractive index and a thickness that are the same as those of the second upper cladding layer 816, is formed on the third upper cladding layer 817, it is possible to set the refractive index of each of the materials of the second upper cladding layer 816 and the fourth upper cladding layer 818 to 1.94. In such a case, the second upper cladding layer 816 and the fourth upper cladding layer 818 can be deposited as silicon oxide nitride ($SiO_xN_y$) films by use of a conventional CMOS manufacturing line. Further, by using a construction comprising more numbers of antireflection layers, the refractive index of silicon oxide nitride can be further lowered. In FIG. 8, symbol t82 denotes a thickness from a bottom surface of a concavity 820b on the top surface of the core layer 814 to the bottom surface of the core layer 814. Symbol t83 denotes a thickness of the first lower cladding layer 802. Symbol t86 denotes a thickness from the top surface of the second upper cladding layer 816 to the top surface of the third upper cladding layer 817. Symbol t87 denotes a thickness of the fourth upper cladding layer 818.

In all of the above described embodiments, it is important to optimize the thickness of the core, for maximizing the upward emission efficiency. The distance from the bottom surface of a concavity part in the periodic concavity and convexity part on the top surface of the core layer to the bottom surface of the core layer may be set to that in a range of length determined by subtracting, from a wavelength of light in the material forming the core layer multiplied by ($\frac{1}{2}\pm\frac{1}{8}$), a depth of the concavity multiplied by ½. The operation for subtracting the depth of the concavity multiplied by ½ is correction operation for reflecting the construction that the concavities and the convexities are formed on the top surface of the core layer; and this technique is not taught in prior-art techniques relating to grating couplers.

In addition, regarding the thickness of the first lower cladding layer, the upward emission efficiency can be maximized, when the thickness is set to that obtained by multiplying, by (($2m_4-1)/4\pm\frac{1}{8}$) ($m_4$ being a positive integer), the wavelength of light in the material forming the first lower cladding layer, wherein the light is that inputted/outputted to/from the grating coupler.

Further, it is effective, for maximizing the upward emission efficiency, to set the depth of the concavity and convexity part on the surface of the core layer to ⅛ or less of the wavelength of light in the material forming the core layer, wherein the light is that inputted/outputted to/from the grating coupler. Further, by adopting the above setting, there is effect to reduce a reflection loss that is to be incurred as a result that the light inputted to the grating part from the input waveguide part collides with the part from which the periodic concavity and convexity part of the grating starts. In this regard, the emission efficiency per unit length of the grating is lowered, if the depth of the periodic concavity and convexity part is excessively shallow; thus, optimization of the depth, according to a specification of a grating coupler which is aimed at, is necessary.

In the above description, embodiments of the present invention have been explained with reference to the figures; however, it should be reminded that it is possible for a person skilled in the art to use other embodiments similar to those described above, and perform modification of embodiments and/or addition of constructions to the embodiments without departing from the present invention.

REFERENCE SIGNS LIST

100 Grating coupler
101 Substrate

102 BOX layer
116 Upper cladding layer
114, 214, 314, 514, 814 Core layer
230, 231 Downwardly scattered light
232, 233 Upwardly scattered light
240 Gap in a grating element
242 Silicon layer
250, 350, 550, 850 Light
300, 500, 800 Structure of a grating
301, 501, 801 Second lower cladding layer
302, 502, 802 First lower cladding layer
316, 515, 815 First upper cladding layer
317, 516, 816 Second upper cladding layer
320a, 320b, 520a, 520b, 820a, 820b Concavity and convexity
340 End of first upper cladding layer
517, 817 Third upper cladding layer
818 Fourth upper cladding layer
819 Fifth upper cladding layer

The invention claimed is:

1. A grating structure for a grating coupler comprising:
a core layer which includes a top surface on which a periodic concavity and convexity part is formed;
a first upper cladding layer which is in contact with the top surface of the core layer;
a second upper cladding layer which is in contact with a top surface of the first upper cladding layer; and
a first lower cladding layer which is in contact with a bottom surface of the core layer; wherein
concavities in the concavity and convexity part are filled with a material which is the same as that of the first upper cladding layer;
a refractive index of a material forming the core layer is larger than any of refractive indexes of materials of the first upper cladding layer, the second upper cladding layer, and the first lower cladding layer;
the refractive index of the material of the first upper cladding layer is larger than the refractive index of the material of the second upper cladding layer; and
a thickness from a top surface of a convexity in the concavity and convexity part to the top surface of the first upper cladding layer is that in a range of length determined by subtracting, from a wavelength of light in the material forming the first upper cladding layer multiplied by $((2m_1-1)/4 \pm 1/8)$ (wherein $m_1$ is a positive integer), a depth of the concavity and convexity part multiplied by $1/2$, wherein the light is that inputted/outputted to/from the grating coupler.

2. A grating structure for a grating coupler comprising:
a core layer which includes a top surface on which a periodic concavity and convexity part is formed;
a first upper cladding layer which is in contact with the top surface of the core layer;
a second upper cladding layer which is in contact with a top surface of the first upper cladding layer;
a third upper cladding layer which is in contact with a top surface of the second upper cladding layer; and
a first lower cladding layer which is in contact with a bottom surface of the core layer; wherein
concavities in the concavity and convexity part are filled with a material which is the same as that of the first upper cladding layer;
a refractive index of a material forming the core layer is larger than any of refractive indexes of materials of the first upper cladding layer, the third upper cladding layer, and the first lower cladding layer;
the refractive index of the material of the second upper cladding layer is larger than any of the refractive indexes of materials of the first upper cladding layer and the third upper cladding layer;
a thickness from a top surface of a convexity in the concavity and convexity part to the top surface of the first upper cladding layer is that in a range of length determined by multiplying, by $(m_2/2 \pm 1/8)$ (wherein $m_2$ is a positive integer), a wavelength of light in the material forming the first upper cladding layer, wherein the light is that inputted/outputted to/from the grating coupler, or in a range of length determined by subtracting, from the wavelength multiplied by $(m_2/2 \pm 1/8)$, a depth of the concavity and convexity part multiplied by $1/2$; and
a thickness of the second upper cladding layer is that determined by multiplying, by $((2m_3-1)/4 \pm 1/8)$ (wherein $m_3$ is a positive integer), a wavelength of light in the material forming the second upper cladding layer, wherein the light is that inputted/outputted to/from the grating coupler.

3. The grating structure according to claim 1 wherein:
a distance from a bottom surface of a concavity in the concavity and convexity part to the bottom surface of the core layer is that in a range of length determined by subtracting, from a wavelength of light in the material forming the core layer multiplied by $(1/2 \pm 1/8)$, the depth of the concavity multiplied by $1/2$.

4. The grating structure according to claim 1 wherein:
a thickness of the first lower cladding layer is that determined by multiplying, by $((2m_4-1)/4 \pm 1/8)$ (wherein $m_4$ is a positive integer), a wavelength of light in the material forming the first lower cladding layer, wherein the light is that inputted/outputted to/from the grating coupler.

5. The grating structure according to claim 1 wherein:
a depth of the concavity and convexity part is equal to or less than a wavelength of light in the material forming the core layer multiplied by $1/8$, wherein the light is that inputted/outputted to/from the grating coupler.

6. The grating structure according to claim 1 wherein:
the material of the first upper cladding layer is silicon nitride or silicon oxide nitride or silicon.

7. The grating structure according to claim 2 wherein:
the material of the second upper cladding layer is silicon nitride or silicon oxide nitride.

8. A method for manufacturing a grating coupler comprising the steps of:
forming a photoresist pattern on a core layer positioned above a first lower cladding layer, wherein openings are formed at positions on the photoresist pattern that correspond to those of concavities of a grating which is to be made;
forming a concavity and convexity part of the grating, by using the photoresist pattern as a mask and etching a surface of the core layer;
removing the remaining photoresist;
forming a photoresist pattern on the core layer, wherein the photoresist pattern corresponds to a shape of the grating coupler which is to be manufactured;
performing dry etching to etch the core layer up to a surface of the first lower cladding layer;
removing the remaining photoresist;
stacking a first upper cladding layer on the core layer;

forming a photoresist pattern on the first upper cladding layer, wherein the photoresist pattern covers a part corresponding to that of the concavity and convexity part of the grating;
using the photoresist pattern as a mask and applying dry etching to the first upper cladding layer, to leave the first upper cladding layer on the concavity and convexity part of the grating;
removing the remaining photoresist; and
stacking a second upper cladding layer on the first upper cladding layer and the core layer; wherein
a refractive index of a material forming the core layer is larger than any of refractive indexes of materials of the first upper cladding layer, the second upper cladding layer, and the first lower cladding layer;
the refractive index of the material of the first upper cladding layer is larger than the refractive index of the material of the second upper cladding layer;
a thickness from a top surface of a convexity in the concavity and convexity part to the top surface of the first upper cladding layer is that in a range of length determined by multiplying, by $((2m_1-1)/4\pm 1/8)$ (wherein $m_1$ is a positive integer), a wavelength of light in the material forming the first upper cladding layer, wherein the light is that inputted/outputted to/from the grating coupler, or in a range of length determined by subtracting, from the wavelength multiplied by $((2m_1-1)/4\pm 1/8)$, a depth of the concavity and convexity part multiplied by $1/2$.

9. A method for manufacturing a grating coupler comprising the steps of:
forming a photoresist pattern on a core layer positioned above a first lower cladding layer, wherein openings are formed at positions on the photoresist pattern that correspond to those of concavities of a grating which is to be made;
forming a concavity and convexity part of the grating, by using the photoresist pattern as a mask and etching a surface of the core layer;
removing the remaining photoresist;
forming a photoresist pattern on the core layer, wherein the photoresist pattern corresponds to a shape of the grating coupler which is to be manufactured;
performing dry etching to etch the core layer up to a surface of the first lower cladding layer;
removing the remaining photoresist;
stacking a first upper cladding layer on the core layer;
stacking a second upper cladding layer on the first upper cladding layer;
forming a photoresist pattern on the second upper cladding layer, wherein the photoresist pattern covers a part corresponding to that of the concavity and convexity part of the grating;
using the photoresist pattern as a mask and applying dry etching to the second upper cladding layer, to leave the second upper cladding layer on the concavity and convexity part of the grating;
removing the remaining photoresist; and
stacking a third upper cladding layer on the first upper cladding layer and the second upper cladding layer; wherein
a refractive index of a material forming the core layer is larger than any of refractive indexes of materials of the first upper cladding layer, the second upper cladding layer, the third upper cladding layer, and the first lower cladding layer;
the refractive index of the material of the second upper cladding layer is larger than any of the refractive indexes of the materials of the first upper cladding layer and the third upper cladding layer;
a thickness from a top surface of a convexity in the concavity and convexity part to the top surface of the first upper cladding layer is that in a range of length determined by subtracting, from a wavelength of light in the material forming the first upper cladding layer multiplied by $(m_2/2\pm 1/8)$ (wherein $m_2$ is a positive integer), a depth of the concavity and convexity part multiplied by $1/2$, wherein the light is that inputted/outputted to/from the grating coupler; and
a thickness of the second upper cladding layer is that determined by multiplying, by $((2m_3-1)/4\pm 1/8)$ (wherein $m_3$ is a positive integer), a wavelength of light in the material forming the second upper cladding layer, wherein the light is that inputted/outputted to/from the grating coupler.

10. The grating structure according to claim 2 wherein:
a distance from a bottom surface of a concavity in the concavity and convexity part to the bottom surface of the core layer is that in a range of length determined by subtracting, from a wavelength of light in the material forming the core layer multiplied by $(1/2\pm 1/8)$, the depth of the concavity multiplied by $1/2$.

11. The grating structure according to claim 2 wherein:
a thickness of the first lower cladding layer is that determined by multiplying, by $((2m_4-1)/4\pm 1/8)$ (wherein $m_4$ is a positive integer), a wavelength of light in the material forming the first lower cladding layer, wherein the light is that inputted/outputted to/from the grating coupler.

12. The grating structure according to claim 2 wherein:
a depth of the concavity and convexity part is equal to or less than a wavelength of light in the material forming the core layer multiplied by $1/8$, wherein the light is that inputted/outputted to/from the grating coupler.

* * * * *